Patented Jan. 30, 1940

2,188,870

UNITED STATES PATENT OFFICE 2,188,870

PROCESS OF PREPARING DERIVATIVES OF THE CYCLOPENTANOPOLYHYDRO- PHENANTHRENE

Max Bockmühl, Gustav Ehrhart, Heinrich Ruschig, and Walter Aumüller, Frankfort-on- the-Main-Hochst, Germany, assignors to Winthrop Chemical Company, Inc., New York, N. Y., a corporation of New York No Drawing. Application June 7, 1937, Serial No. 146,958. In Germany June 11, 1936

3 Claims. (Cl. 260—397)

The present invention relates to a process of preparing derivatives of the cyclopentanopoly-hydrophenanthrene.

In U. S. application Serial No. 49,644 filed November 13, 1935, in the name of Max Bockmühl, Gustav Ehrhart and Heinrich Ruschig a process of preparing ketones of polycyclic hydroaromatic compounds is described which comprises subjecting to the degradation process according to Curtius compounds of the general formula

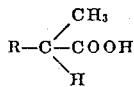

wherein R stands for a cyclopentanopolyhydrophenanthrene radical, and oxidizing the amines thus obtained, if desired after having transformed them into the corresponding alcohols, the double bond which may be present being protected in a manner in itself known, namely, by the introduction of substituents which may afterwards be removed.

Now we have found a process of preparing derivatives of the cyclopentanopolyhydrophenanthrene which comprises transforming saturated acids of the general formula

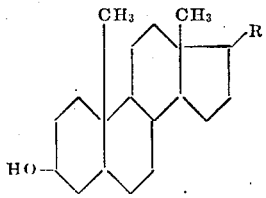

wherein R stands for a —COOH group or for a

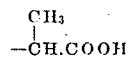

group, by a degradation method in itself known in which the carboxyl group is separated and an amine is obtained as intermediate product, into the alcohol or ketone corresponding with the amine and at any stage of the process producing a double bond by oxidizing the hydroxyl group standing in 3-position into the keto group and subsequently treating with halogenating agents and eliminating hydrogen halide, the halogenation and dehalogenation of such compounds as in 3-position contain a keto group and in the cyclopentane ring contain a CH₃CHOH group or a CH₃CO group, being excluded.

The process may for instance be carried out by oxidising in the said acids the 3-hydroxyl group to the keto group, treating the keto-acid obtained with halogenating agents, eliminating hydrogen halide from the halogenated keto acids thus formed and subjecting the unsaturated keto acids to a Curtius degradation process, whereby the amines formed are transformed into the corresponding alcohols or ketones. During this operation the halogenated keto acids may also be dehalogenated after they have been transformed into the halogenated amines, hydroxy-ketones or di-ketones formed by the degradation. The same or a similar result is attained if the said carboxylic acids are first subjected to the Curtius degradation method and after the oxidation of the 3-hydroxyl group to the keto group the amines obtained are halogenated, hydrogen halide is eliminated from the halogenated amino ketones formed and the unsaturated amino compounds obtained are transformed into the corresponding hydroxy-ketones or di-ketones. In this mode of operating the hydrogen halide need not be eliminated at the above-mentioned stage of the reaction, but may be eliminated at any further step of the operation, for instance from the halogenated hydroxy-ketones or di-ketones.

In the same manner the process of the present invention may be applied to the 3-hydroxy- aetiocholanyl carboxylic acid (17). In this case the sequence of the different steps of the reaction may likewise be varied in any desired way as mentioned above.

As the acids used as parent material, such as the bisnorlithocholic acid, may relatively readily and cheaply be obtained from bile acids the present process is a new and industrially valuable way of preparing substances of the character of the sexual hormones.

The accompanying three tables of formulae illustrate the different possibilities of varying the process and the way of obtaining with the aid of the present process the hormones known as progesterone and testosterone.

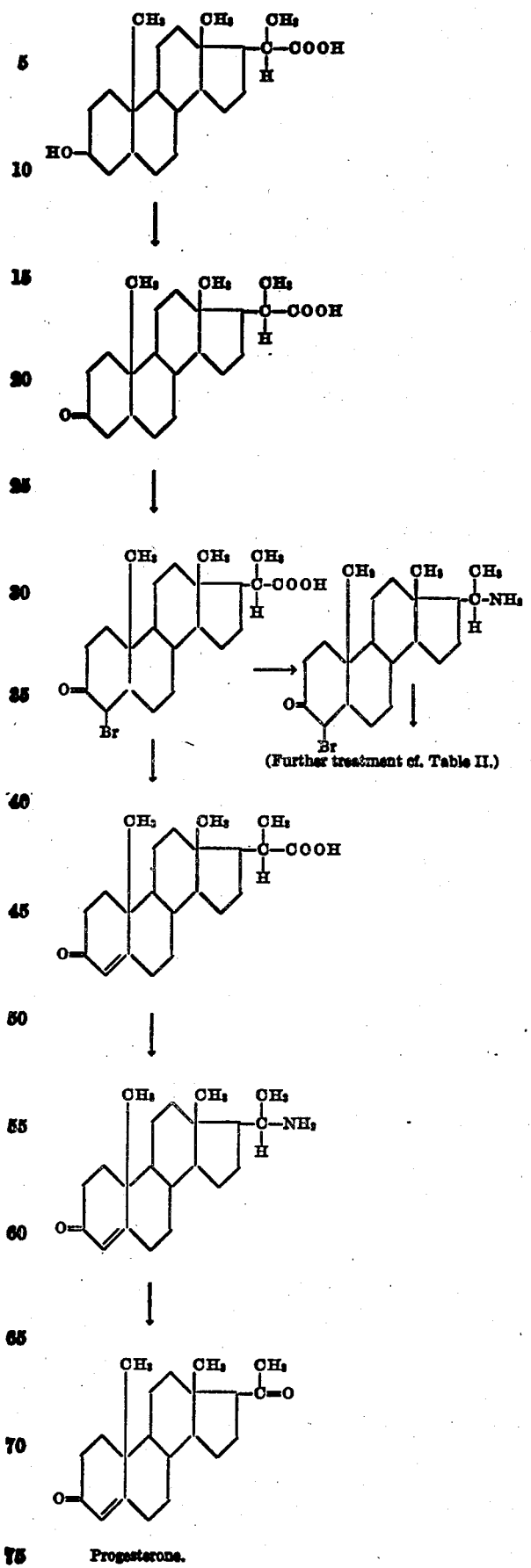
Table I
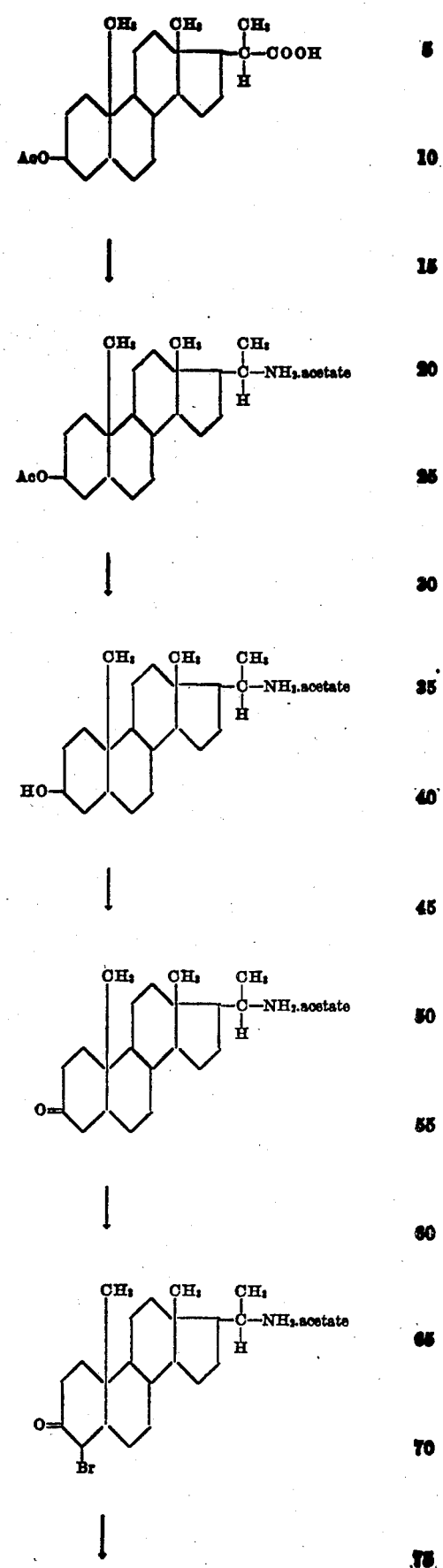
Table II

Table II—Continued
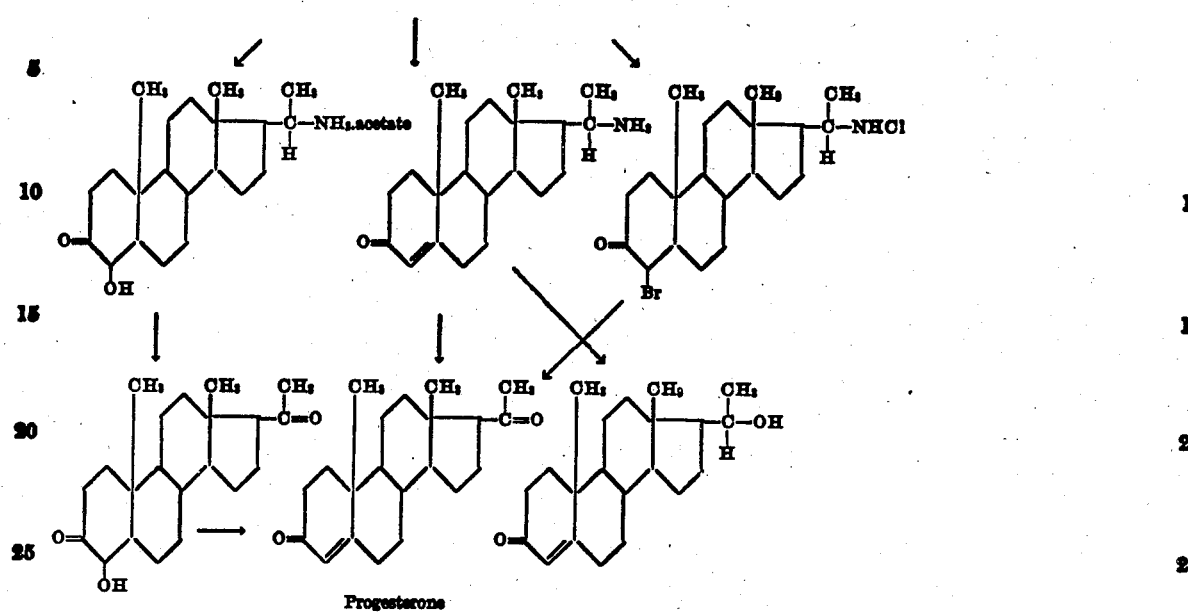
Table III
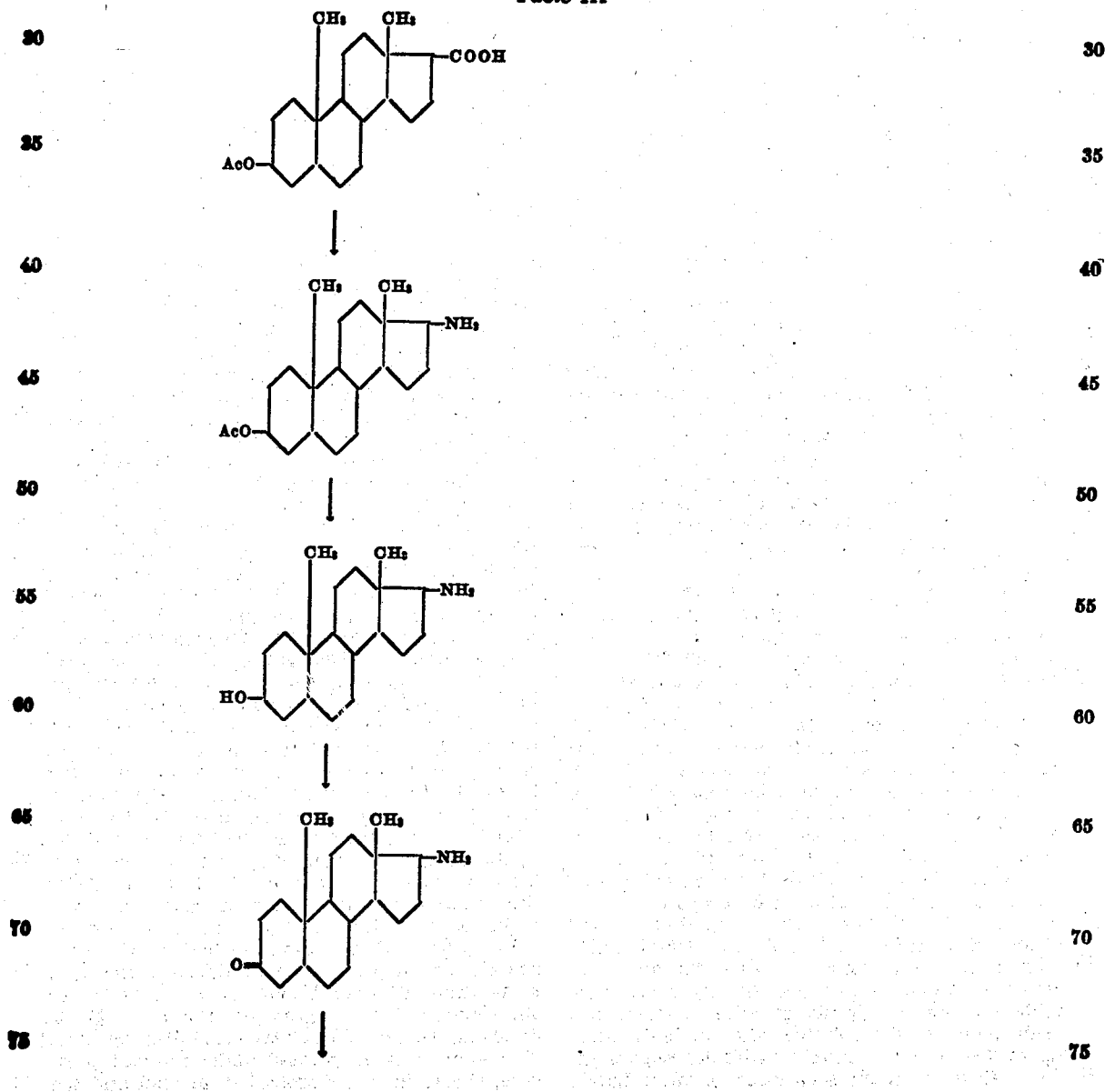

*Table III*—Continued

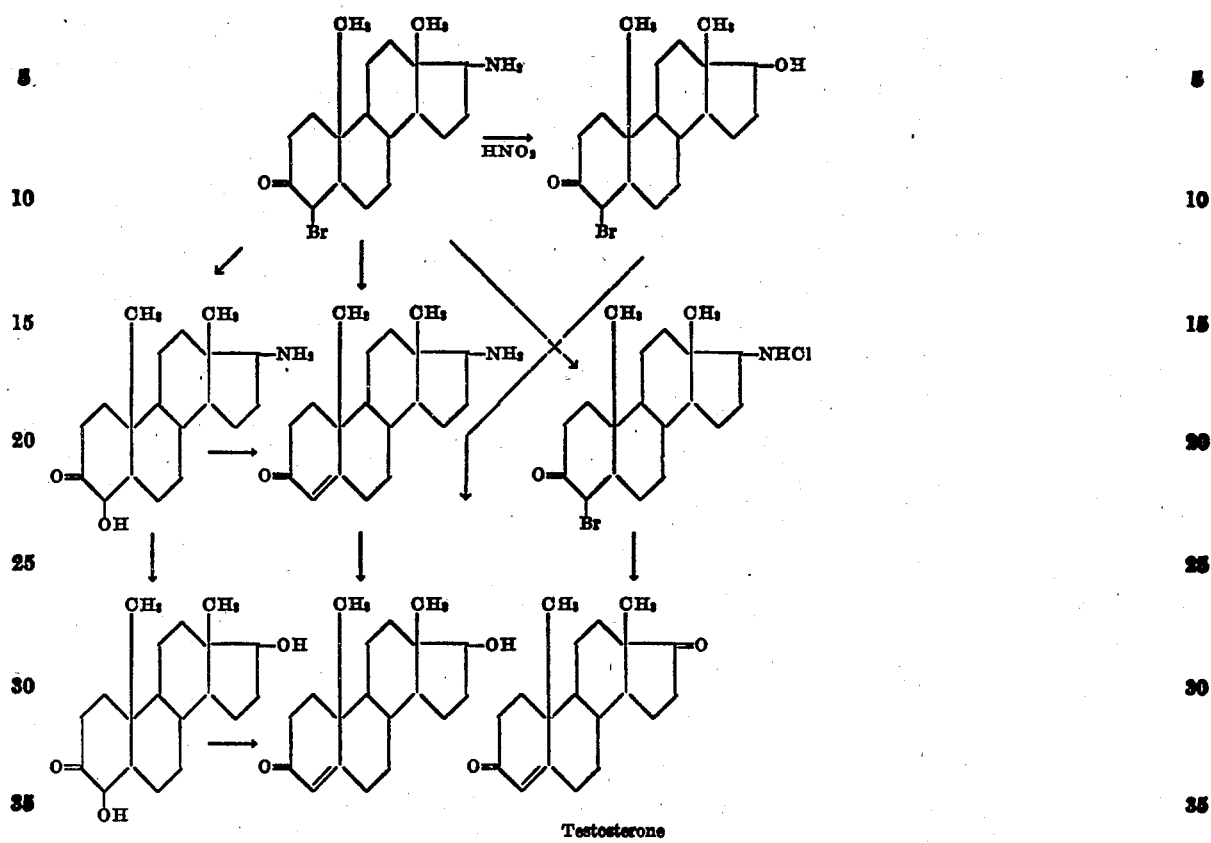

Testosterone

The following examples serve to illustrate the invention, but they are not intended to limit it thereto:

(1) 18 grams of acetyl-bisnorlithocholic acid which may be prepared with application of the process described in U. S. application Serial No. 98,402 filed August 28, 1936 in the name of Max Bockmühl, Gustav Ehrhart and Heinrich Ruschig are transformed into the acid chloride by means of three times their weight of thionyl chloride as described in U. S. application Serial No. 49,644 filed November 13, 1935, in the name of Max Bockmühl, Gustav Ehrhart and Heinrich Ruschig and the azide, iso-cyanate and amine are prepared from the acid chloride also as therein described.

10 grams of the amine acetate are then dissolved in glacial acetic acid and 2.64 grams of chromic acid (1.5 O) in glacial acetic acid are caused slowly to flow into this solution. The oxidation solution is allowed to stand for 24 hours at 15° C. The small excess of chromic acid is then destroyed with the aid of zinc dust, the solution is concentrated under reduced pressure and water is added. The amine is set free by means of a solution of sodium carbonate and the mixture is extracted with ether. From the dry ethereal solution the 3-oxo-ternorcholanyl amine is precipitated in the form of the acetate.

5 grams of this oxo-amine are dissolved in glacial acetic acid and after some drops of hydrobromic acid have been added a solution of 2.12 grams of bromine (=1 mol) in glacial acetic acid is caused to flow into the solution. The latter is at once decolorized and hydrogen bromide escapes. 5 grams of silver acetate are then added to the solution, the whole is made up to 600 cc. and heated in a reflux apparatus. After 45 minutes the separation of silver halide is finished. The solution of the unsaturated oxo-amine obtained is filtered and transformed into the progesterone as described in the above named U. S. application Serial No. 49,644. During this operation the hydrochloric acid may be separated not only with the aid of pyridine but likewise with the aid of sodium alcoholate.

If the solution of 5 grams of oxo-amine and 2.12 grams of bromine referred to above is boiled for 2 hours in a reflux apparatus together with an alcoholic alkali lye chiefly the 3-oxo-4-hydroxy-ternorcholanyl-amine is obtained.

(2) 5 grams of 3-acetoxyaetiocholanyl carboxylic acid (19) are transformed into the corresponding chloride as described in the U. S. application Serial No. 132,635 filed March 23, 1937, in the name of Max Bockmühl, Gustav Ehrhart and Heinrich Ruschig, which is decomposed so as to obtain the corresponding amine.

A solution of 0.85 grams of chromic acid (1.5 O) in glacial acetic acid is caused to flow into a solution of 3 grams of hydroxyaetiocholanyl-amine-acetate in glacial acetic acid and the mixture is allowed to stand for 24 hours at 15° C. After zinc dust has been added the small excess of chromic acid is destroyed, the solution is evaporated under reduced pressure, water is added to the residue which is rendered alkaline by means of a solution of sodium carbonate and the free oxo-amine is extracted with ether. After the ethereal solution has been dried the oxo-amine is precipitated in the form of the acetate.

1.5 grams of the 3-oxo-aetiocholanyl-amine acetate are then dissolved in glacial acetic acid, some drops of hydrobromic acid are added to the solution and 0.69 gram of bromine in 10 cc. of glacial acetic acid is introduced drop by drop. The solution is evaporated under reduced pressure, the residue is dissolved in alcohol and the amino group of the 3-oxo-4-bromaetiocholanyl-amine acetate is boiled on the water bath with sodium nitrite and acetic acid as described in the above named U. S. application Serial No. 132,635. The solution is diluted with water and extracted with ether and the residue of the ethereal solution is debrominated with the aid of silver acetate and glacial acetic acid as described in Example 1. By the addition of water and recrystallization from hexane the acyl-testosterone of melting point 140° C. is obtained.

We claim:

1. The process which comprises transforming a saturated acid of the general formula

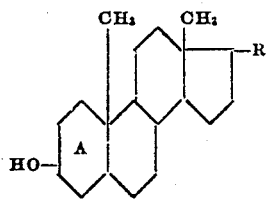

wherein R stands for a member of the group consisting of

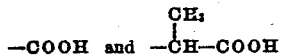

by means of the Curtius degradation method into the corresponding amine, oxidizing the 3-hydroxyl group into the keto group with the aid of an oxidizing agent and producing a double bond in ring A of the compound by a treatment with a halogenating agent and a subsequent treatment with an agent splitting off halogen-halide.

2. The process which comprises transforming acetyl-bisnorlithocholic acid by means of thionyl chloride into the corresponding acid chloride and transforming the acid chloride into the acid azide with the aid of sodium azide, heating the azide and saponifying the isocyanate thus formed with the aid of an acid so as to obtain the corresponding amine, oxidizing this amine with chromic acid to the 3-oxo-ternorcholanyl amine, causing bromine to act upon said compound and debrominating the compound thus formed by means of silver acetate.

3. The process which comprises oxidizing hydroxy-aetiocholanyl-amine-acetate with chromic acid in the presence of glacial acetic acid, causing bromine to act upon the 3-oxo-aetiocholanyl-amine-acetate thus formed, transforming this amine into the corresponding hydroxyl compound by causing it to react with nitrous acid and debrominating the reaction product by means of silver acetate.

MAX BOCKMÜHL.
GUSTAV EHRHART.
HEINRICH RUSCHIG.
WALTER AUMÜLLER.

CERTIFICATE OF CORRECTION.

Patent No. 2,188,870.          January 30, 1940.

MAX BOCKMÜHL, ET AL.

It is hereby certified that error appears in the printed specification of the above numbered patent requiring correction as follows: Page 4, line 36, Table III, below the row of three formulae in lines 26 to 35, strike out the word "Testosterone" and insert the same in line 36, below the middle formula in said row of three; and that the said Letters Patent should be read with this correction therein that the same may conform to the record of the case in the Patent Office.

Signed and sealed this 2nd day of July, A. D. 1940.

(Seal)

Henry Van Arsdale,
Acting Commissioner of Patents.